United States Patent
Takagi

(10) Patent No.: US 8,662,239 B2
(45) Date of Patent: Mar. 4, 2014

(54) SERIES-HYBRID VEHICLE

(75) Inventor: Izumi Takagi, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 50 days.

(21) Appl. No.: 13/339,330

(22) Filed: Dec. 28, 2011

(65) Prior Publication Data

US 2013/0168176 A1 Jul. 4, 2013

(51) Int. Cl.
*B60K 6/20* (2007.10)

(52) U.S. Cl.
USPC ...................................... 180/291; 180/65.245

(58) Field of Classification Search
USPC .................. 180/291, 65.245, 65.22
See application file for complete search history.

(56) References Cited

U.S. PATENT DOCUMENTS

| | | | |
|---|---|---|---|
| 4,697,660 A * | 10/1987 | Wu et al. ..................... | 180/65.25 |
| 7,296,648 B2 * | 11/2007 | Tatara et al. .................. | 180/242 |
| 7,317,295 B2 * | 1/2008 | Izumi et al. ................... | 318/801 |
| 7,497,285 B1 * | 3/2009 | Radev ....................... | 180/65.225 |
| 8,256,549 B2 * | 9/2012 | Crain et al. ................ | 180/65.31 |
| 8,499,870 B2 * | 8/2013 | Nakamura et al. ........... | 180/68.3 |

FOREIGN PATENT DOCUMENTS

JP 2011-073582 A 4/2011

\* cited by examiner

*Primary Examiner* — John Walters
(74) *Attorney, Agent, or Firm* — Alleman Hall McCoy Russell & Tuttle LLP

(57) ABSTRACT

A series-hybrid vehicle is provided, comprising a vehicle body frame; a pair of right and left front wheels; a pair of right and left rear wheels; a drive motor mounted to the vehicle body frame to drive the front wheels or the rear wheels; a battery mounted to a center portion of the vehicle body frame in a forward and rearward direction to supply electric power to the drive motor; an engine electric generator including an electric generator for generating electric power charged into the battery and an engine for actuating the electric generator; and a driver seat; wherein the driver seat is positioned rightward or leftward relative to a center portion of the vehicle body frame in a vehicle width direction; and the engine is positioned at an opposite side of the driver seat relative to the center portion of the vehicle body frame in the vehicle width direction.

5 Claims, 6 Drawing Sheets

SERIES-HYBRID VEHICLE

BACKGROUND OF THE INVENTION

1. Field of the Invention

The present invention relates to a series-hybrid vehicle configured to charge a battery with electric power generated in an engine electric generator, and actuate a drive motor by the electric power supplied from the battery.

2. Description of the Related Art

Japanese Laid-Open Patent Application Publication No. 2011-73582 discloses an exemplary conventional series-hybrid vehicle. In this series-hybrid vehicle, a battery is disposed between right and left rear wheels. If the weight of the battery is great, a load applied to the rear wheels is greater than a load applied to front wheels. As a result, a good weight balance in a forward and rearward direction cannot be maintained in the vehicle, and steerability of the vehicle becomes degraded. In addition, a seat on which a driver is seated is positioned rightward relative to the center portion of a vehicle body frame in a vehicle width direction, and an engine for use in power generation is positioned in the center portion of the vehicle body frame in the vehicle width direction. Therefore, if a driver alone is riding in the vehicle, a good weight balance in the vehicle width direction cannot be maintained in the vehicle, and steerability of the vehicle becomes degraded.

SUMMARY OF THE INVENTION

The present invention addresses the above described condition, and an object of the present invention is to improve in a hybrid vehicle, a weight balance in a forward and rearward direction and in a rightward and leftward direction, for the purpose of improved steerability of the hybrid vehicle.

A series-hybrid vehicle of the present invention comprises a vehicle body frame; a pair of right and left front wheels suspended from a front portion of the vehicle body frame; a pair of right and left rear wheels suspended from a rear portion of the vehicle body frame; a drive motor mounted to the vehicle body frame and configured to drive the front wheels or the rear wheels; a battery mounted to a center portion of the vehicle body frame in a forward and rearward direction and configured to supply electric power to the drive motor; an engine electric generator including an electric generator for generating electric power charged into the battery and an engine for actuating the electric generator; and a driver seat on which a driver is seated; wherein the driver seat is positioned rightward or leftward relative to a center portion of the vehicle body frame in a vehicle width direction; and the engine is positioned at an opposite side of the driver seat relative to the center portion of the vehicle body frame in the vehicle width direction.

In such a configuration, the center of gravity of the entire battery can be located at the center portion of the vehicle body frame in the forward and rearward direction, and the center of gravity of a total load which is a sum of the weight of the engine and the weight of the driver seated on the driver seat can be located at a substantially center portion of the vehicle body frame in the vehicle width direction. As a result, a weight balance in the forward and rearward direction and in the vehicle width direction can be improved in the hybrid vehicle. This allows the driver to steer the hybrid vehicle more easily, even when a number of batteries are mounted in the hybrid vehicle and the weight of the entire battery assembly is increased, for example.

The above and further objects, features and advantages of the invention will more fully be apparent from the following detailed description with reference to the accompanying drawings.

DETAILED DESCRIPTION OF THE PREFERRED EMBODIMENTS

Hereinafter, an embodiment of the present invention will be described with reference to the drawings. The stated directions are referenced from the perspective of a driver riding in a series-hybrid vehicle. A rightward and leftward direction conforms to a vehicle width direction. It is supposed that the series-hybrid vehicle is in a stopped state on a ground surface which is substantially parallel to a horizontal plane.

Figure 1:
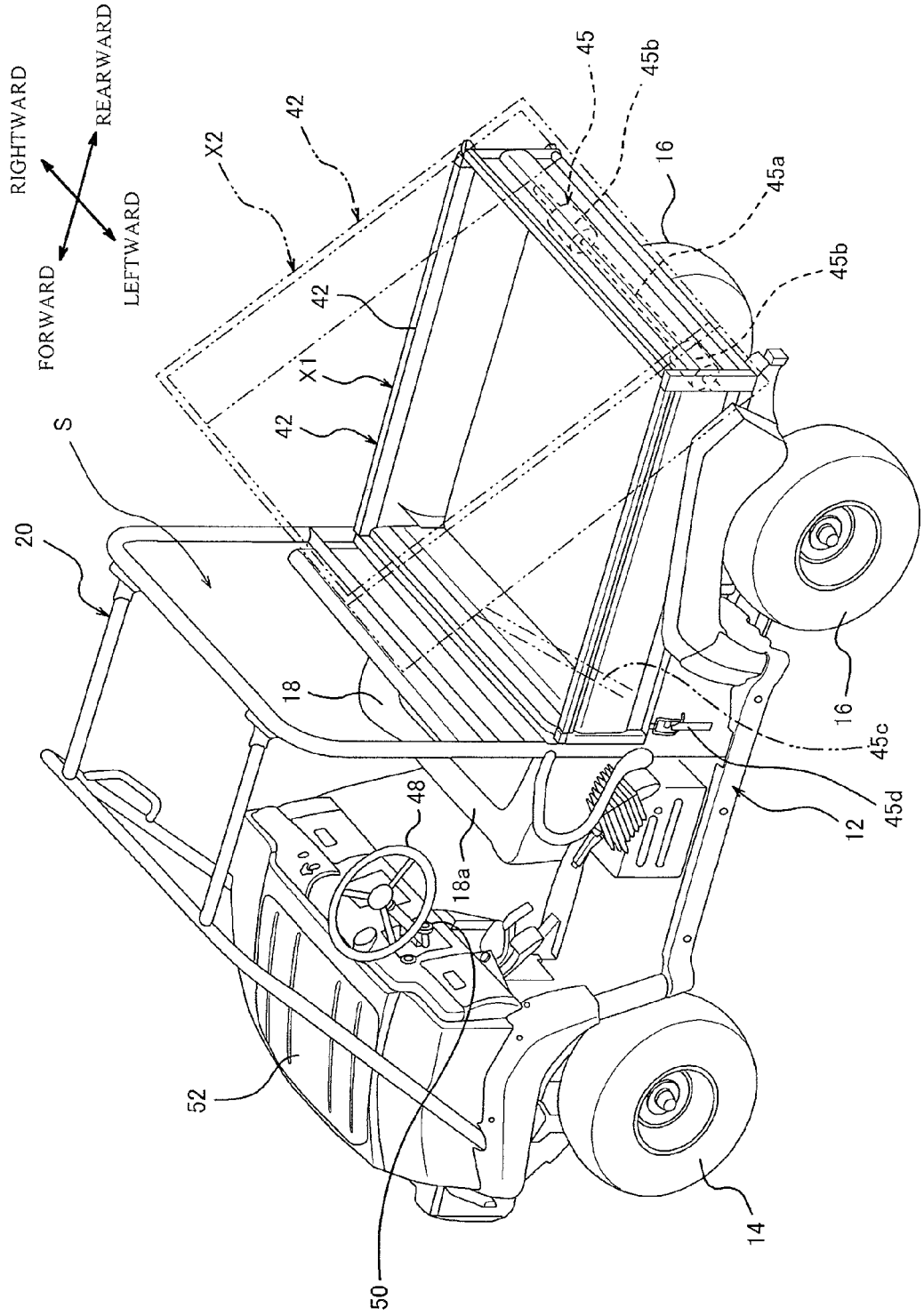
FIG. 1 is a perspective view showing an external appearance of a series-hybrid vehicle according to an embodiment, when viewed from obliquely above.
Figure 2:
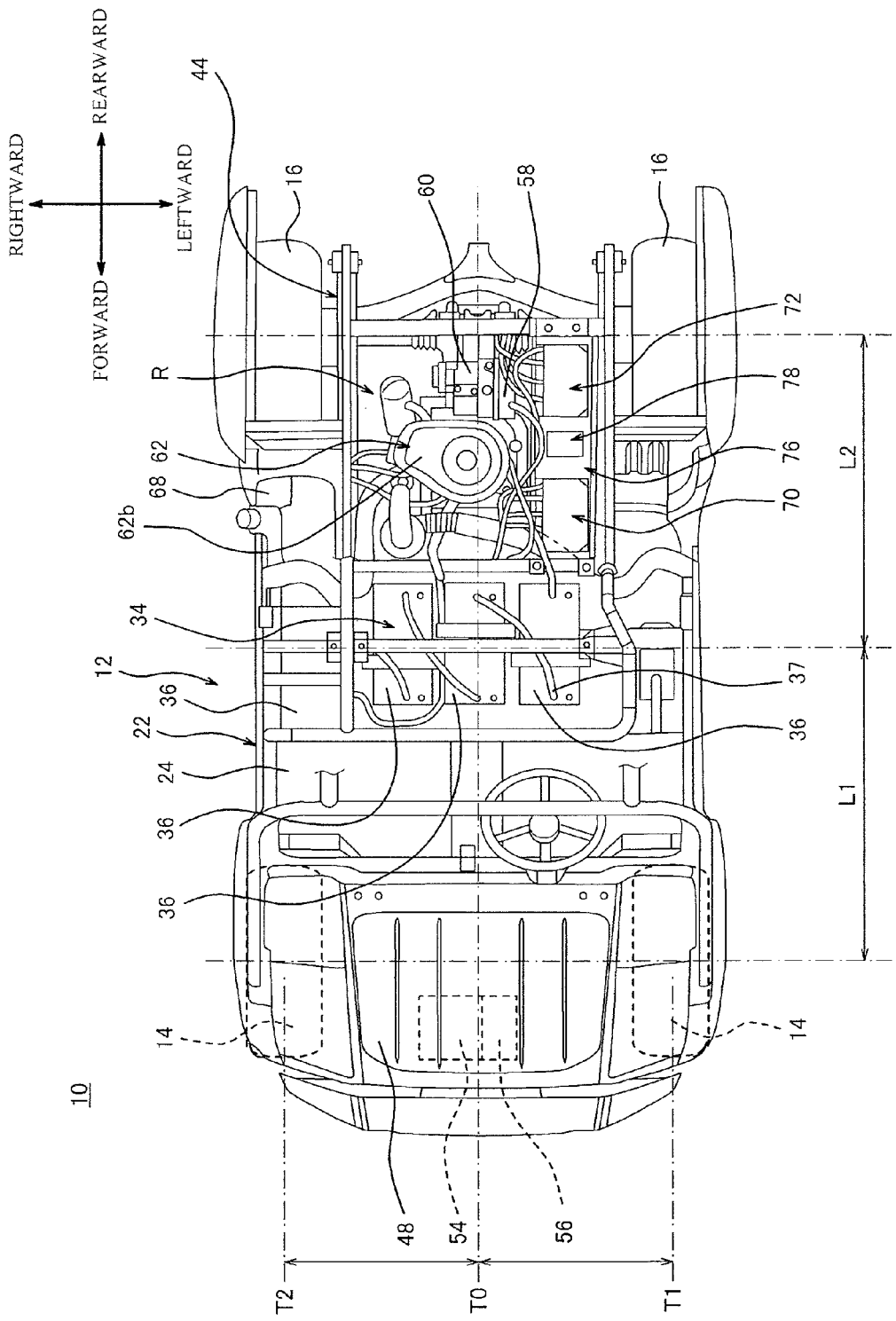
FIG. 2 is a plan view of the series-hybrid vehicle according to the embodiment, showing a state where a seat and a cargo bed are detached from the series-hybrid vehicle.
Figure 3:
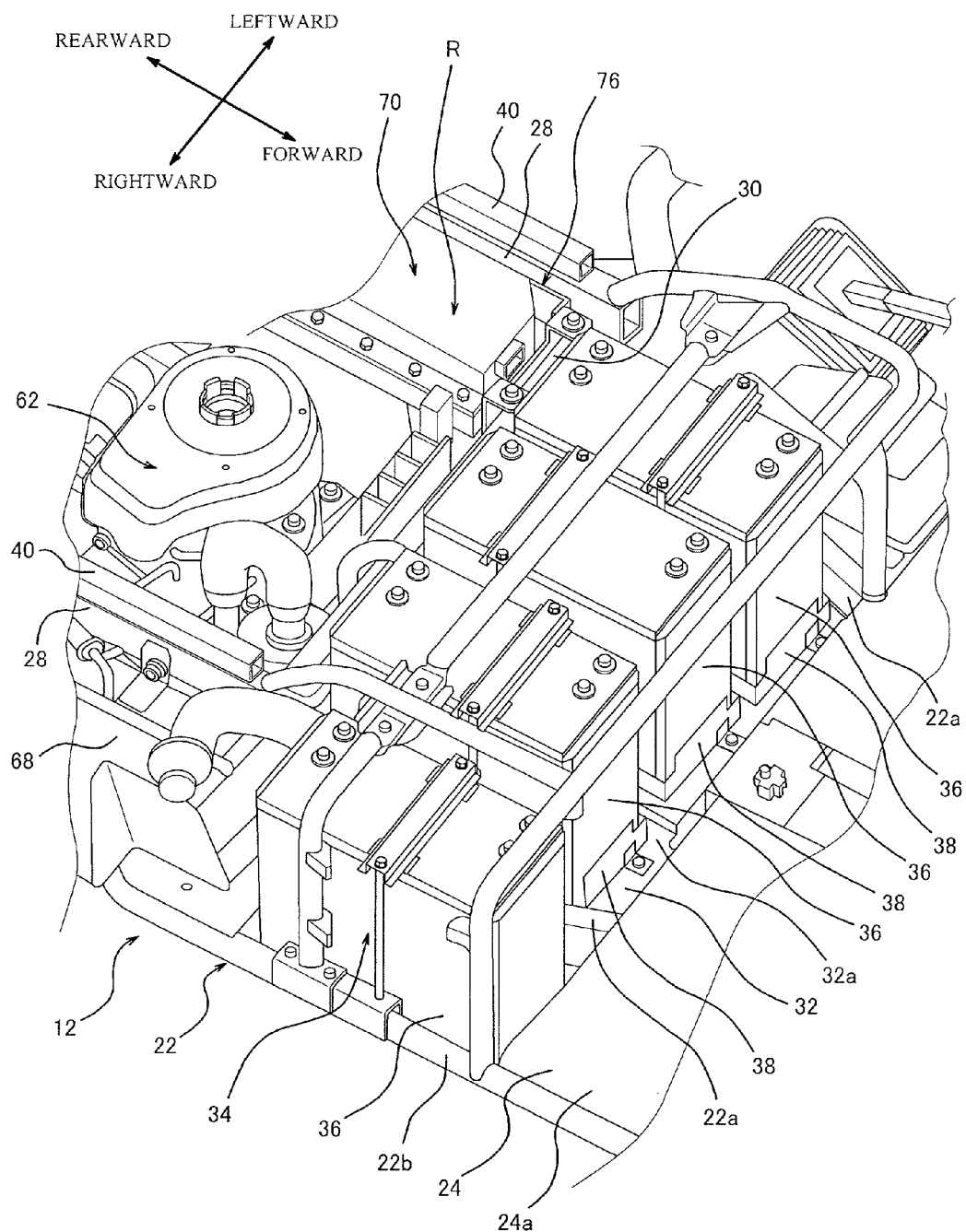
FIG. 3 is a perspective view showing a configuration of a vehicle body frame, and a battery unit in the series-hybrid vehicle according to the embodiment, when viewed from obliquely above.
Figure 4:
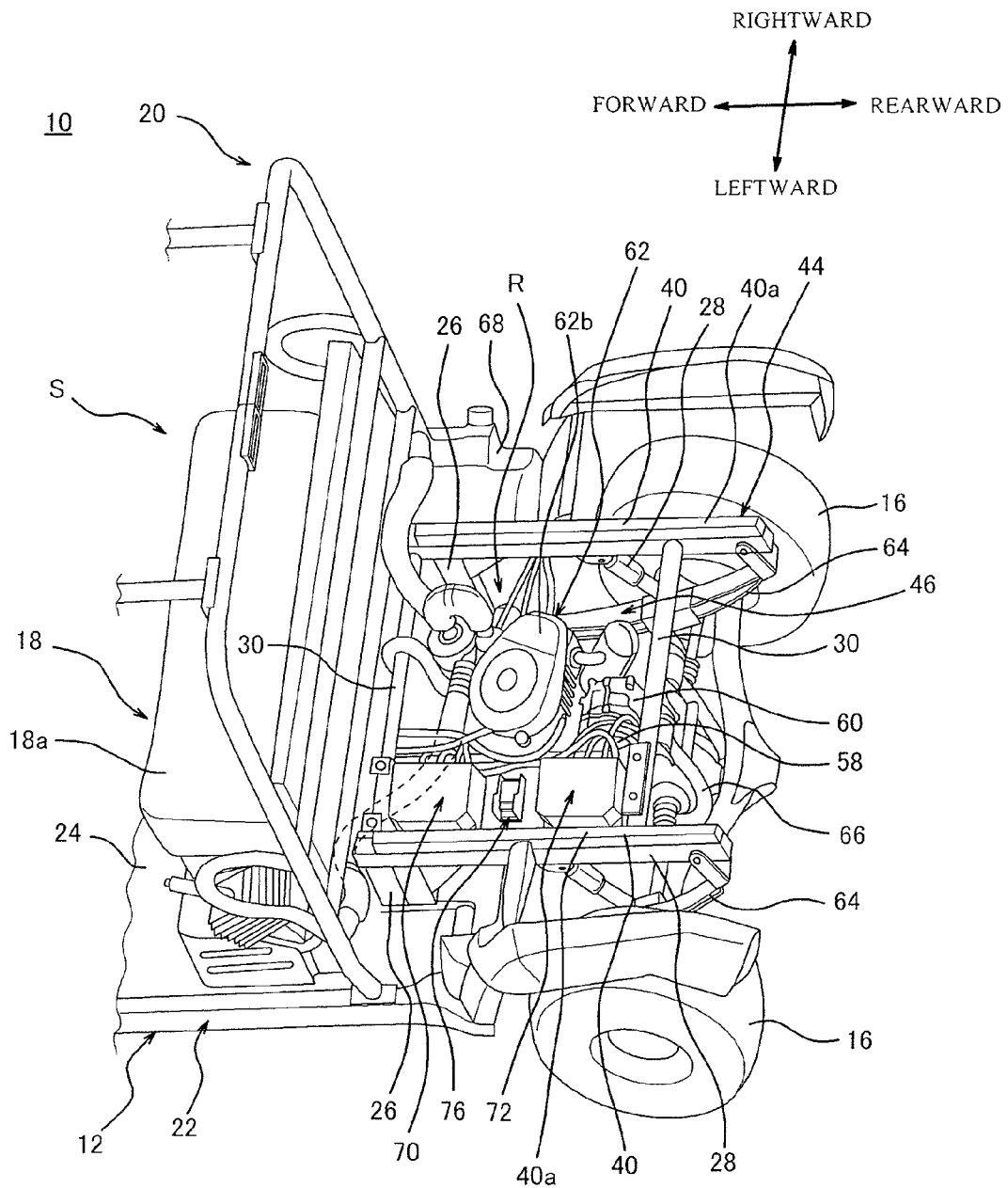
FIG. 4 is a perspective view of the series-hybrid vehicle according to the embodiment, showing a state where the cargo bed is detached from the series-hybrid vehicle, when viewed from obliquely above.

FIG. 1 is a perspective view showing an external appearance of a series-hybrid vehicle 10 (hereinafter referred to as hybrid vehicle 10) according to an embodiment, when viewed from obliquely above. FIG. 2 is a plan view of the hybrid vehicle 10, showing a state where a seat 18 (FIG. 1) and a cargo bed 42 (FIG. 1) are detached from the hybrid vehicle 10. FIG. 3 is a perspective view showing a configuration of a vehicle body frame 12, and a battery unit 34 in the hybrid vehicle 10, when viewed from obliquely above. FIG. 4 is a perspective view of the hybrid vehicle 10, showing a state where the cargo bed 42 (FIG. 1) is detached from the hybrid vehicle 10, when viewed from obliquely above. In the present embodiment, the hybrid vehicle 10 is used in various ways, for example, as a golf cart, or a farming truck, and is sometimes referred to as a utility vehicle.

As shown in FIG. 1, the hybrid vehicle 10 includes the vehicle body frame 12, a pair of right and left front wheels 14 suspended from the front portion of the vehicle body frame 12, a pair of right and left rear wheels 16 suspended from the rear portion of the vehicle body frame 12, a bench seat 18 provided in the center portion of the vehicle body frame 12 in a forward and rearward direction (lengthwise direction of the hybrid vehicle 10) to extend in the vehicle width direction, and a cabin frame 20 surrounding the seat 18. A cabin space S is defined as a region where the seat 18 is disposed, inwardly relative to the cabin frame 20.

As shown in FIGS. 2~4, the vehicle body frame 12 includes a main frame 22 placed to face the road surface or the ground surface. As shown in FIG. 4, the vehicle body frame 12 includes a pair of right and left rear side frames 28 coupled to the rear portion of the main frame 22 via coupling members 26 and extending in the forward and rearward direction, and two cross members 30 provided between and coupled to the rear side frames 28.

As shown in FIG. 3, the main frame 22 includes a plurality of square pipes 22a each having a substantially rectangular cross-section and a plurality of round pipes 22b each having a substantially circular cross-section. The square pipes 22a and the round pipes 22b are joined together. A floor panel 24 is mounted to a portion of the main frame 22, constituting the floor of the cabin space S (FIG. 1), while battery support plates 32 are mounted to a portion of the main frame 22, which is below the seat 18 (FIG. 1). The floor panel 24 is a member of a substantially plate shape and constitutes the floor surface of the cabin space S (FIG. 1). An upper surface 24a of the floor panel 24 is substantially as high as or higher than a highest point of the square pipes 22a and a highest point of the round pipes 22b. The battery support plates 32 are substantially-plate-shaped members for supporting the batteries 36, respectively, and an upper surface 32a of each of the battery support plates 32 is positioned below the highest point of the square pipes 22a and the highest point of the round pipes 22b. A plurality of (in the present embodiment, four) batteries 36 constituting the battery unit 34 are mounted to upper surfaces 32a of the battery support plates 32 via battery holders 38, respectively.

As shown in FIG. 4, the coupling members 26 are members of a substantially plate shape extending vertically. The lower end portion of each of the coupling members 26 is coupled to the main frame 22, while the upper end portion of each of the coupling members 26 is coupled to the front end portion of the corresponding rear side frame 28. Therefore, the rear side frame 28 is positioned higher than the main frame 22 by a length of the coupling member 26, and a distance from the road surface or the ground surface to the rear side frame 28 is greater than a distance from the road surface or the ground surface to the main frame 22. The rear side frame 28 is a pipe member having a substantially rectangular cross-section. A cargo bed support member 40 of a pipe shape having a substantially rectangular cross-section is coupled to the upper surface of the corresponding rear side frame 28. The rear side frame 28 and the cargo bed support member 40 may have a unitary pipe shape.

As shown in FIG. 4, the two rear side frames 28 are arranged substantially in parallel to be apart from each other in the vehicle width direction. The two rear side frames 28 are coupled together by two cross members 30 extending in the vehicle width direction. In this structure, a frame member 44 of a substantially rectangular shape when viewed from above is provided in the rear portion of the vehicle body frame 12. A space within the frame member 44 is an engine room R in which a rear wheel drive motor 58, an engine electric generator 62, and others are arranged.

As shown in FIG. 1, the seat 18 has a length for allowing two passengers to be seated thereon side by side in the rightward and leftward direction. A portion of the seat 18 which is located leftward relative to the center portion in the vehicle width direction is a driver seat 18a. The driver seat 18a is positioned leftward relative to the center portion of the vehicle body frame 12 in the vehicle width direction. As shown in FIG. 2, when a position of the left front wheel 14 or a position of the left rear wheel 16 in the vehicle width direction is referred to as a left wheel position T1, a position of the right front wheel 14 or a position of the right rear wheel 16 in the vehicle width direction is referred to as a right wheel position T2, and a middle position which is equally distant from the left wheel position T1 and from the right wheel position T2 is a center position T0 in the vehicle width direction (vehicle width direction center position T0), the driver seat 18a (FIG. 1) is positioned leftward relative to the vehicle width direction center position T0. As shown in FIG. 1, a handle 48 is provided in front of the driver seat 18a, and a key switch 50 which is operated by the driver to start the hybrid vehicle 10 is provided in the vicinity of the handle 48. A hood 52 is mounted to a portion of the vehicle body frame 12 which is forward relative to the cabin space S.

As shown in FIG. 1, the hybrid vehicle 10 includes a cargo bed 42 provided behind the driver seat 18a and a cargo bed displacement mechanism 45. The cargo bed 42 is constituted by a plurality of steel plates joined together in a rectangular shape. The rear portion of the cargo bed 42 is coupled to the frame member 44 (FIG. 4) via the cargo bed displacement mechanism 45. The cargo bed displacement mechanism 45 includes a rotary shaft 45a mounted to the frame member 44 (FIG. 4), two bearings 45b provided at the rear portion of the cargo bed 42 to be spaced apart from each other in the vehicle width direction, and a dumper 45c for pressing up the cargo bed 42. The bearings 45b are supported by the rotary shaft 45a. The cargo bed displacement mechanism 45 is actually invisible, and therefore is indicated by broken lines in FIG. 1.

As indicated by solid lines in FIG. 1, in a state where the hybrid vehicle 10 is able to drive, the cargo bed 42 is placed on the upper surfaces of the cargo bed support members 40 (FIG. 4) and covers an upper opening 46 (FIG. 4) of the engine room R (FIG. 4). A position of the cargo bed 42 covering the opening 46 is a first position X1. In a state where the cargo bed 42 is in the first position X1, the front portion of the cargo bed 42 is secured to the vehicle body frame 12 by lock mechanisms 45d. As indicated by two-dotted lines in FIG. 1, when maintenance of the engine electric generator 62 (FIG. 4), and others is carried out, the lock mechanisms 45d are unlocked, and an operator lifts up the front portion of the cargo bed 42 by hand. Thereupon, the cargo bed 42 is pivoted upward around the rotary shaft 45a, and the upper opening 46 (FIG. 4) of the engine room R (FIG. 4) is open. A position of the cargo bed 42 in a state where the opening 46 is open is a second position X2. The cargo bed displacement mechanism 45 displaces the cargo bed 42 such that the cargo bed 42 is pivotable between the first position X1 and the second position X2.

Referring to FIG. 2, the hybrid vehicle 10 includes a front wheel drive motor 54 for driving the front wheels 14, a driving power transmission mechanism 56 for transmitting the driving power generated in the front wheel drive motor 54 to the front wheels 14, a rear wheel drive motor 58 for driving the rear wheels 16, a driving power transmission mechanism 60 for transmitting the driving power generated in the rear wheel drive motor 58 to the rear wheels 16, the engine electric generator 62, and the battery unit 34 including the plurality of batteries. In the present embodiment, the hybrid vehicle 10 is a series-hybrid vehicle, and the plurality of batteries 36 of the battery unit 34 are charged with the electric power generated by the engine electric generator 62, and the front wheel drive motor 54 and the rear wheel drive motor 58 are actuated by the electric power supplied from the battery unit 34.

As shown in FIG. 2, the front wheels 14 are suspended from both side portions of the front portion of the main frame 22 in the vehicle width direction via suspension devices (not shown), and the front wheel drive motor 54 and the driving power transmission mechanism 56 are arranged at the center portion of the front portion of the main frame 22 in the vehicle width direction. As shown in FIG. 4, the rear wheels 16 are suspended from the both side portions of the frame member 44 in the vehicle width direction via suspension devices 64.

The rear wheel drive motor 58, the driving power transmission mechanism 60 and the engine electric generator 62 are arranged in the engine room R.

As shown in FIG. 2, the battery unit 34 is positioned at the center portion of the vehicle body frame 12 in the forward and rearward direction. As shown in FIG. 3, each of the plurality of batteries 36 constituting the battery unit 34 is mounted to the upper surface 32a of the battery support plate 32 via the battery holder 38. As shown in FIG. 2, when a position of an axle of the front wheel 14 is a front wheel axle position P1, a position of an axle of the rear wheel 16 is a rear wheel axle position P2, and a position of the plurality of batteries 36 in the forward and rearward direction is a battery mount position P0, a first distance L1 from the front wheel axle position P1 to the battery mount position P0 is set substantially equal to a second distance L2 from the rear wheel axle position P2 to the battery mount position P0. Because of this design, a good weight balance in the forward and rearward direction can be maintained in the hybrid vehicle 10. The plurality of batteries 36 are interconnected via electric wires 37. In this way, the battery unit 34 can have a required voltage (e.g., 48V) and a required capacity.

Figure 5:
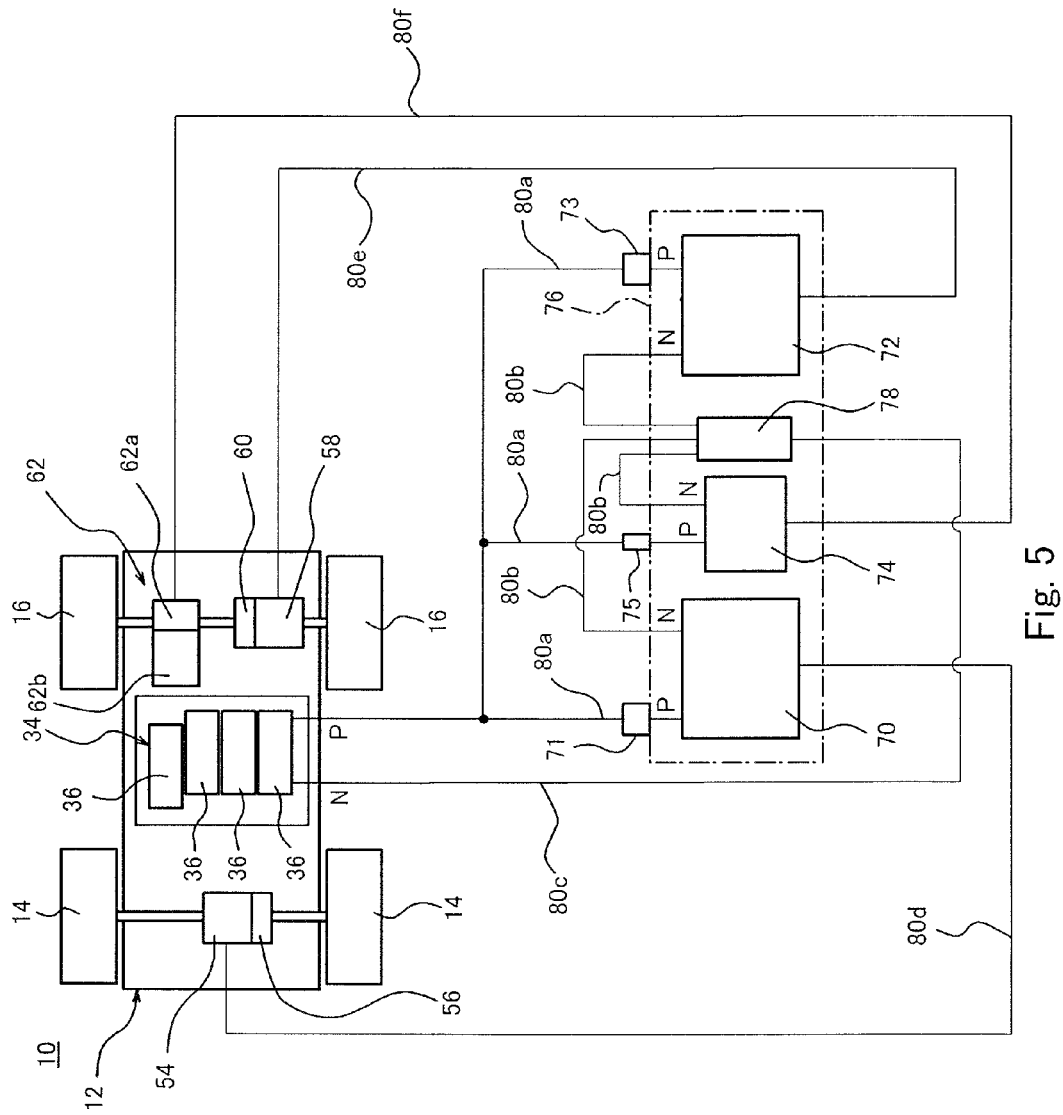
FIG. 5 is a view showing the layout of electric wires in the series-hybrid vehicle according to the embodiment.

FIG. 5 is a view showing the layout of electric wires in the hybrid vehicle 10 according to the embodiment. As shown in FIG. 5, the engine electric generator 62 includes an electric generator 62a and an engine 62b for actuating the electric generator 62a. The electric generator 62a operates as an electric generator for generating AC power charged into the batteries 36, or as a starter for starting the engine 62b. In the present embodiment, the engine 62b is an engine placed vertically, and having a crankshaft (not shown) which extends vertically. The electric generator 62a is mounted to the lower portion of a crankcase (not shown) accommodating the lower end portion of the crankshaft. The vertical length of the engine 62b, i.e., a vertical length of the crankshaft (not shown), is greater than a length thereof perpendicular to the crankshaft, i.e., a length in the forward and rearward direction or a length in the rightward and leftward direction. The dimension (FIG. 2) of the engine 62b when viewed from above is smaller than the dimension (not shown) of the engine 62b when viewed from forward or from laterally.

As shown in FIG. 4, the engine electric generator 62, the rear wheel drive motor 58 and the driving power transmission mechanism 60 are mounted to a sub-frame 66 mounted to the main frame 22 and to the frame member 44. As shown in FIG. 2, the engine 62b of the engine electric generator 62 is positioned rightward relative to the center portion of the vehicle body frame 12 in the vehicle width direction, at an opposite side of the driver seat 18a. A fuel tank 68 for storing a fuel supplied to the engine 62b is positioned rightward relative to the center portion of the vehicle body frame 12 in the vehicle width direction (the fuel tank 68 and the engine 62b are at the same side relative to the center portion of the vehicle body frame 12 in the vehicle width direction). The center of gravity of the engine 62b is located rightward relative to the vehicle width direction center position T0, at an opposite side of the driver seat 18a, while the fuel tank 68 is positioned rightward relative to the vehicle width direction center position T0 (the engine 62b and the fuel tank 68 are located at the same side relative to the vehicle width direction center position T0). Because of this layout, a good weight balance in the vehicle width direction can be maintained in the hybrid vehicle 10, in a state where the driver is seated on the driver seat 18a.

As shown in FIG. 2, the engine 62b of the engine electric generator 62 is positioned forward (closer to the center of the vehicle body) relative to the rear wheel drive motor 58, and the center of gravity of the engine 62b is positioned closer to the center of the vehicle body frame 12 in the forward and rearward direction. In this way, a weight balance in the forward and rearward direction is improved in the hybrid vehicle 10. The rear wheel drive motor 58 is deviated leftward from the engine 62b and is positioned at one side end portion of the vehicle body frame 12 in the vehicle width direction. Heat generated in the engine 62b tends to be transferred in a rearward direction. By positioning the rear wheel drive motor 58 outside a path through which heat radiated from the engine 62b is transferred, the rear wheel drive motor 58 is protected from the heat.

Figure 6:
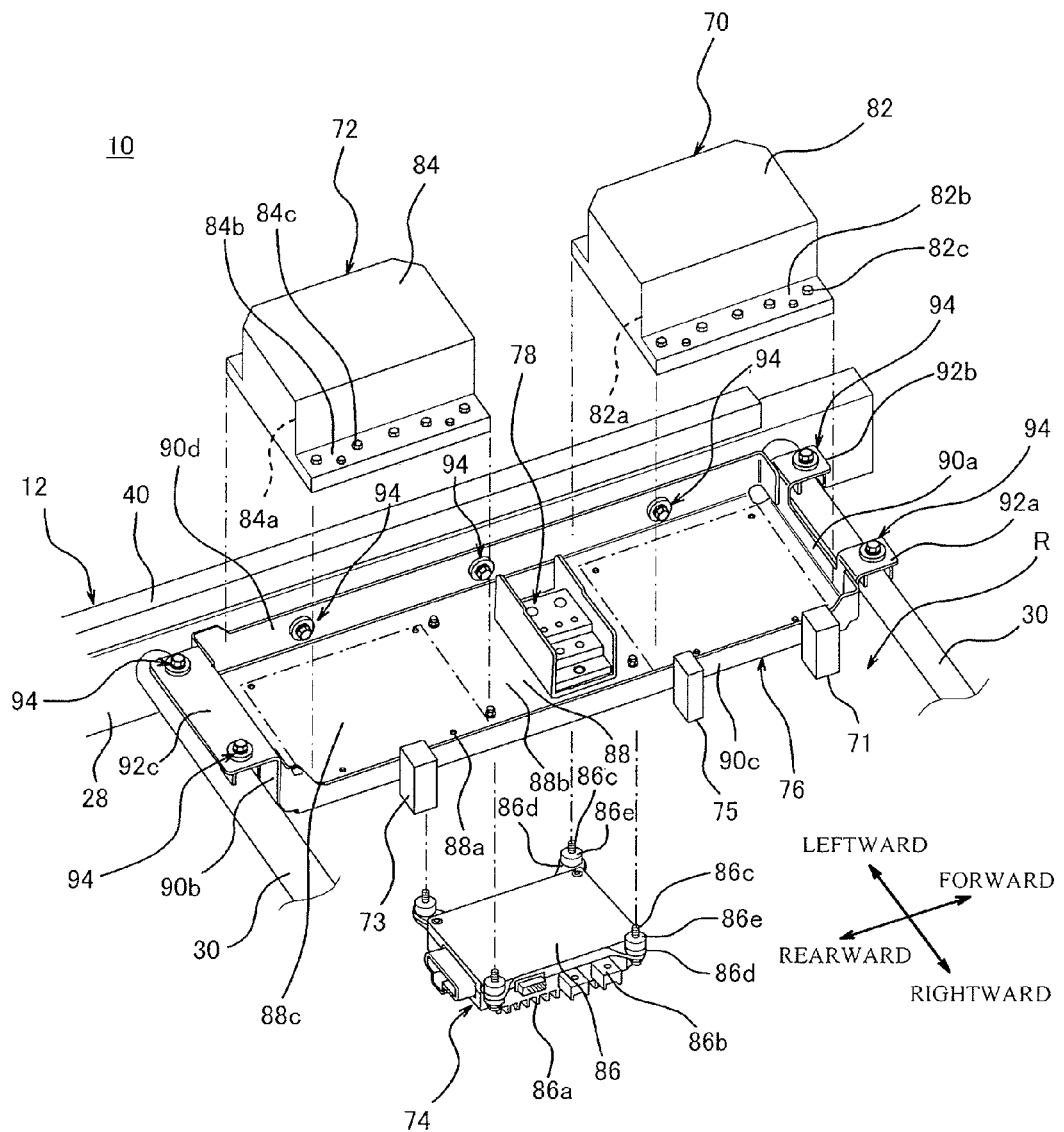
FIG. 6 is an exploded perspective view of a heat radiation plate, a front wheel drive motor controller, a rear wheel drive motor controller, and an electric generator controller, when viewed from obliquely above.

FIG. 6 is an exploded perspective view of a heat radiation plate 76, a front wheel drive motor controller 70, a rear wheel drive motor controller 72, and an electric generator controller 74, when viewed from obliquely above. The front wheel drive motor controller 70, the rear wheel drive motor controller 72, and the electric generator controller 74 are electric components which generate and radiate heat when they are activated.

As shown in FIGS. 5 and 6, the hybrid vehicle 10 includes the front wheel drive motor controller 70 for controlling electric power supply to the front wheel drive motor 54 (FIG. 5), the rear wheel drive motor controller 72 for controlling electric power supply to the rear wheel drive motor 58 (FIG. 5), an electric generator controller 74 for controlling electric power supply to the engine electric generator 62 (FIG. 5), and the heat radiation plate 76.

As shown in FIG. 5, the front wheel drive motor controller 70 includes an inverter circuit (not shown) which converts the DC power (e.g., 48V) supplied from the battery unit 34 into AC power, and the AC power supplied from the front wheel drive motor 54 into DC power (e.g., 48V), and a control circuit (not shown) for controlling the magnitude or the like of the AC power. The DC plus terminal (P) of the front wheel drive motor controller 70 is coupled to the plus terminal (P) of the battery unit 34 via a contactor 71 and a wire 80a. The DC minus terminal (N) of the front wheel drive motor controller 70 is coupled to the minus terminal (N) of the battery unit 34 via a wire 80b, a collective terminal 78 and a wire 80c. The AC terminal of the front wheel drive motor controller 70 is coupled to the front wheel drive motor 54 via a wire 80d. The contactor 71 is capable of switching between connection and disconnection of an electric circuit for supplying the electric power. In the present embodiment, the electric power supply is enabled when the key switch 50 (FIG. 1) is ON, while the electric power supply is inhibited when the key switch 50 (FIG. 1) is OFF.

As shown in FIG. 6, the front wheel drive motor controller 70 has a block-like casing 82 having a substantially flat lower surface 82a. A side portion 82b of the casing 82, which faces the inside of the engine room R, is provided with a plurality of terminals 82c coupled to the wires 80a and 80b, and others (FIG. 5).

Referring to FIG. 5, the rear wheel drive motor controller 72 includes an inverter circuit (not shown) which converts DC power (e.g., 48V) supplied from the battery unit 34 into AC power, and converts AC power supplied from the rear wheel drive motor 58 into DC power (e.g., 48V), and a control circuit (not shown) for controlling the magnitude of the AC power, or the like. The DC plus terminal (P) of the rear wheel drive motor controller 72 is coupled to the plus terminal (P) of the battery unit 34 via a contactor 73 and a wire 80a. The DC minus terminal (N) of the rear wheel drive motor controller 72 is coupled to the minus terminal (N) of the battery unit 34 via a wire 80b, the collective terminal 78 and a wire 80c. The AC terminal of the rear wheel drive motor controller 72 is coupled to the rear wheel drive motor 58 via a wire 80e. The contactor 73 is capable of switching between connection and disconnection of an electric circuit for supplying the electric power. In the present embodiment, the electric power supply is enabled when the key switch 50 (FIG. 1) is ON, while the electric power supply is inhibited when the key switch 50 (FIG. 1) is OFF.

As shown in FIG. 6, the rear wheel drive motor controller 72 has a block-like casing 84 having a substantially flat lower surface 84a. A side portion 84b of the casing 84, which faces inside of the engine room R, is provided with a plurality of terminals 84c coupled to the wires 80a and 80b, and others (FIG. 5).

Referring to FIG. 5, the electric generator controller 74 includes an inverter circuit (not shown) which converts the DC power (e.g., 48V) supplied from the battery unit 34 into AC power, and converts AC power supplied from the engine electric generator 62 into DC power (e.g., 48V), and a control circuit (not shown) for controlling the engine electric generator 62. The DC plus terminal (P) of the electric generator controller 74 is coupled to the plus terminal (P) of the battery unit 34 via a contactor 75 and a wire 80a. The DC minus terminal (N) of the electric generator controller 74 is coupled to the minus terminal (N) of the battery unit 34 via a wire 80b, the collective terminal 78 and a wire 80c. The AC terminal of the electric generator controller 74 is coupled to the engine electric generator 62 via a wire 80f. The contactor 75 is capable of switching between connection and disconnection of an electric circuit for supplying the electric power, and is controlled by a control circuit (not shown) of the electric generator controller 74.

As shown in FIG. 6, the electric generator controller 74 has a block-like casing 86 provided with a plurality of fins 86a on a surface thereof. A side portion of the casing 86 is provided with a plurality of terminals 86b coupled to the wires 80a and 80b, and others (FIG. 5). The casing 86 is provided with a plurality of (in the present embodiment, four) mounting elements 86d having holes (not shown) into which bolts 86c are inserted, respectively. A substantially tubular spacer 86e is provided around the outer periphery of each of the bolts 86c inserted into the holes (not shown) to ensure a space between the casing 86 and the heat radiation plate 76.

Referring to FIG. 6, the heat radiation plate 76 is configured to support the front wheel drive motor controller 70, the rear wheel drive motor controller 72, and the electric generator controller 74. In addition, the heat radiation plate 76 is configured to store heat generated in these electric components and radiate heat from its outer surface. The heat radiation plate 76 is formed by bending a single plate member. As a material used for the heat radiation plate 76, metal capable of storing heat and radiating the heat from its outer surface is preferably used. Particularly, metal which has a high stiffness and a high anti-corrosion property, for example, aluminum alloy or copper, is preferably used. In the present embodiment, as the material of the heat radiation plate 76, aluminum alloy is used. The heat radiation plate 76 is designed to have a heat capacity of 2.5~3.5 [degrees C./W] as a whole.

As shown in FIG. 6, the heat radiation plate 76 includes a flat plate portion 88, four reinforcement portions 90a, 90b, 90c, and 90d for reinforcing the flat plate portion 88, and three engagement elements 92a, 92b and 92c engaged with the cross member 30 of the vehicle body frame 12 from above. The heat radiation plate 76 is mounted to the vehicle body frame 12 using a plurality of (in the present embodiment, seven) coupling mechanisms 94. As shown in FIG. 4, in a state where the heat radiation plate 76 is coupled to the vehicle body frame 12, the heat radiation plate 76 is mounted to one side end portion of the vehicle body frame 12 in the vehicle width direction, above the rear wheel drive motor 58, such that the heat radiation plate 76 extends in the forward and rearward direction. As shown in FIG. 6, the flat plate portion 88 extends substantially horizontally along the side surface of the rear side frame 28. The front wheel drive motor controller 70 and the rear wheel drive motor controller 72 are arranged side by side on the upper (obverse) surface 88b of the flat plate portion 88 in the forward and rearward direction, and the electric generator controller 74 is positioned on the center portion (in the forward and rearward direction) of the lower (reverse) surface (not shown) of the flat plate portion 88.

Referring to FIG. 5, to start-up the hybrid vehicle 10, the driver seated on the driver seat 18a turns ON the key switch 50 (FIG. 1), thereby allowing the contactors 71 and 73 to supply the electric power. Then, the front wheel drive motor controller 70 converts the DC power of the battery unit 34 into AC power, which actuates the front wheel drive motor 54. Also, the rear wheel drive motor controller 72 converts the DC power of the battery unit 34 into AC power, which actuates the rear wheel drive motor 58. When the value of the SOC (state of charge) of the battery unit 34 decreases to a value less than a predetermined value with a passage of a driving time of the hybrid vehicle 10, the electric generator 62a of the engine electric generator 62 starts the engine 62b by the driver's operation or automatically. Then, the engine 62b actuates the electric generator 62a to generate AC power. The electric generator controller 74 converts the AC power generated in the electric generator 62a into DC power, which is charged into the battery unit 34. In the case where the front wheel drive motor 54 and the rear wheel drive motor 58 act as regenerative brakes, the AC power generated in the front wheel drive motor 54 is converted into DC power by the front wheel drive motor controller 70 and the AC power generated in the rear wheel drive motor 58 is converted into DC power by the rear wheel drive motor controller 72. DC power is charged into the battery unit 34. In the front wheel drive motor controller 70, the rear wheel drive motor controller 72, and the electric generator controller 74, inverter circuits and the like (not shown) built in these controllers generate heat. This heat is transferred to the heat radiation plate 76 and stored therein. And, the heat is radiated from the entire outer surface of the heat radiation plate 76.

In accordance with the hybrid vehicle 10 of the present embodiment configured above, the following advantages are achieved.

As shown in FIG. 2, the center of gravity of the plurality of batteries 36 can be located at the center portion of the vehicle body frame 12 in the forward and rearward direction, and the center of gravity of a total load which is a sum of the weight of the engine 62b and the weight of the driver seated on the driver seat 18a (FIG. 1) can be located at a substantially center portion of the vehicle body frame 12 in the vehicle width direction. As a result, a weight balance in the forward and rearward direction and in the vehicle width direction can be improved in the hybrid vehicle 10. This allows the driver to steer the hybrid vehicle 10 more easily, even when the weight of the battery unit 34 is great.

As shown in FIG. 2, since the engine 62b is positioned below the cargo bed 42 (FIG. 1), exhaust gas emitted from the engine 62b can be directed easily in a rearward direction, which can reduce a length of an exhaust muffler. Since the engine 62b is positioned forward (closer to the center of the vehicle body) relative to the rear wheel drive motor 58, the center of gravity of the engine 62b can be made closer to the center portion of the vehicle body frame 12 in the forward and rearward direction. In this way, a weight balance in the forward and rearward direction can be further improved in the hybrid vehicle 10.

As shown in FIG. 2, since the crankshaft (not shown) of the engine 62b extends vertically, reciprocation of a piston is less likely to generate a substantial vertical vibration, thereby lessening vibration felt by the driver. Since the dimension of the engine 62b when viewed from above is reduced, the engine electric generator 62 can be laid out more flexibly.

As shown in FIG. 2, since the rear wheel drive motor 58 is deviated leftward from the engine 62b in the vehicle width direction, it is possible to prevent the rear wheel drive motor 58 from being damaged by the heat generated in the engine 62b. Since the rear wheel drive motor 58 and the heat radiation plate 76 are positioned at one side end portion of the vehicle body frame 12 in the vehicle width direction, air flowing inward from the side of the vehicle body frame 12 can efficiently cool the rear wheel drive motor 58, the heat radiation plate 76, the front wheel drive motor controller 70, the rear wheel drive motor controller 72 and the electric generator controller 74.

As shown in FIG. 1, by displacing the cargo bed 42 from the first position X1 to the second position X2, a work space can be ensured above the engine electric generator 62 and the rear wheel drive motor 58. Therefore, maintenance of the engine electric generator 62, the rear wheel drive motor 58, and others can be carried out easily by utilizing the work space.

As shown in FIG. 2, since the plurality of electric components, which are the front wheel drive motor controller 70, the rear wheel drive motor controller 72, and the electric generator controller 74, are mounted to the single heat radiation plate 76, these electric components can be laid out compactly.

As shown in FIG. 4, since the heat radiation plate 76 is positioned above the rear wheel drive motor 58, and a distance between the rear wheel drive motor 58 and the rear wheel drive motor controller 72 is small, the length of the wire 80e (FIG. 5) can be reduced. This makes it possible to reduce the overall length of a wire harness (not shown) constituting the wires 80b and 80e, etc. As a result, a cost reduction can be achieved, and a possibility of radio disturbance can be lessened.

As shown in FIG. 2, in the present embodiment, the driver seat 18a is positioned leftward relative to the center portion of the vehicle body frame 12 in the vehicle width direction, and the engine 62b is positioned rightward relative to the center portion of the vehicle body frame 12 in the vehicle width direction. In alternative embodiments, the positional relation in the rightward and leftward direction may be reversed. In a further alternative, the rear wheel drive motor 58 may be deviated rightward from the engine 62b.

As shown in FIG. 5, in the present embodiment, the present invention is applied to the four-wheel-drive hybrid vehicle 10 in which the front wheels 14 and the rear wheels 16 are drive wheels. In alternative embodiments, the present invention may be applied to a two-wheel-drive hybrid vehicle in which either the front wheels 14 or the rear wheels 16 are drive wheels.

As shown in FIG. 6, in the present embodiment, the three electric components, which are the front wheel drive motor controller 70, the rear wheel drive motor controller 72, and the electric generator controller 74, are mounted to the heat radiation plate 76. In alternative embodiments, one or two of these electric components may be mounted to the heat radiation plate 76. Instead of these electric components, other electric components may be mounted to the heat radiation plate 76.

As shown in FIG. 1, in the present embodiment, the cargo bed displacement mechanism 45 includes the rotary shaft 45a and the bearings 45b. In alternative embodiments, another cargo bed displacement mechanism may be used so long as it is capable of displacing the cargo bed 42 between the first position X1 and the second position X2.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A series-hybrid vehicle comprising:
   a vehicle body frame;
   a pair of right and left front wheels suspended from a front portion of the vehicle body frame;
   a pair of right and left rear wheels suspended from a rear portion of the vehicle body frame;
   a drive motor mounted to the vehicle body frame and configured to drive the front wheels or the rear wheels;
   a battery mounted to a center portion of the vehicle body frame in a forward and rearward direction and configured to supply electric power to the drive motor;
   an engine electric generator including an electric generator for generating electric power charged into the battery and an engine for actuating the electric generator;
   a driver seat configured to seat a driver;
   a cargo bed provided behind the driver seat;
   an engine room in which the engine electric generator is accommodated, the engine room being provided below the cargo bed; and
   a cargo bed displacement mechanism for displacing the cargo bed;
   wherein the driver seat is positioned rightward or leftward relative to a center portion of the vehicle body frame in a vehicle width direction;
   wherein the engine is accommodated in the engine room such that the engine is positioned at an opposite side of the driver seat relative to the center portion of the vehicle body frame in the vehicle width direction; and
   wherein the cargo bed displacement mechanism is configured to displace the cargo bed between a first position in which the cargo bed covers an upper opening of the engine room, and a second position in which the upper opening of the engine room is open.

2. The series-hybrid vehicle according to claim 1, further comprising:
   a heat radiation plate positioned below the cargo bed in the first position and at one side end portion of the vehicle body frame in the vehicle width direction; wherein
   at least one of an electric generator controller for controlling electric power from the engine electric generator to the battery and a drive motor controller for controlling electric power supply from the battery to the drive motor is mounted to the heat radiation plate.

3. The series-hybrid vehicle according to claim 1, further comprising:
   a heat radiation plate positioned below the cargo bed in the first position and at one side end portion of the vehicle body frame in the vehicle width direction; wherein
   a drive motor controller for controlling electric power supply from the battery to the drive motor is mounted to the heat radiation plate; and the heat radiation plate is positioned above the drive motor.

4. A series-hybrid vehicle comprising:
a vehicle body frame;
a pair of right and left front wheels suspended from a front portion of the vehicle body frame;
a pair of right and left rear wheels suspended from a rear portion of the vehicle body frame;
a drive motor mounted to the vehicle body frame and configured to drive the front wheels or the rear wheels;
a battery mounted to a center portion of the vehicle body frame in a forward and rearward direction and configured to supply electric power to the drive motor;
an engine electric generator including an electric generator for generating electric power charged into the battery and an engine for actuating the electric generator;
a driver seat on which a driver is seated;
a cargo bed provided behind the driver seat; and
a fuel tank for storing a fuel supplied to the engine, the fuel tank being laid out such that the fuel tank and the engine are positioned at a same side relative to the center portion of the vehicle body frame in the vehicle width direction;
wherein the driver seat is positioned rightward or leftward relative to a center portion of the vehicle body frame in a vehicle width direction; and
the engine is positioned below the cargo bed at an opposite side of the driver seat relative to the center portion of the vehicle body frame in the vehicle width direction,
wherein the fuel tank is positioned behind a front end of the driver seat and forward relative to a rear end of the engine, in the forward and rearward direction.

5. A series-hybrid vehicle comprising:
a vehicle body frame;
a pair of right and left front wheels suspended from a front portion of the vehicle body frame;
a pair of right and left rear wheels suspended from a rear portion of the vehicle body frame;
a drive motor mounted to the vehicle body frame and configured to drive the front wheels or the rear wheels;
a battery mounted to a center portion of the vehicle body frame in a forward and rearward direction and configured to supply electric power to the drive motor;
an engine electric generator including an electric generator for generating electric power charged into the battery and an engine for actuating the electric generator;
a driver seat configured to seat a driver;
a cargo bed provided behind the driver seat;
an engine room in which the engine electric generator is accommodated, the engine room being provided below the cargo bed; and
a cargo bed displacement mechanism for displacing the cargo bed;
wherein the cargo bed displacement mechanism is configured to displace the cargo bed between a first position in which the cargo bed covers an upper opening of the engine room, and a second position in which the upper opening of the engine room is open.

* * * * *